Dec. 17, 1963  W. TRAUTNER ETAL  3,114,182

LAMP ASSEMBLY

Filed March 26, 1962

INVENTORS:
WAGN TRAUTNER &
BY DON R. ARMACOST

Fishburn and Gold
ATTORNEYS

United States Patent Office 3,114,182
Patented Dec. 17, 1963

3,114,182
LAMP ASSEMBLY
Wagn Trautner, Overland Park, and Don R. Armacost, Mission Hills, Kans., assignors to Peterson Manufacturing Company, Kansas City, Mo., a corporation of Missouri
Filed Mar. 26, 1962, Ser. No. 182,388
6 Claims. (Cl. 240—8.2)

This invention relates to lamp assemblies, and more particularly to lamp assemblies such as are mounted on vehicles where they are subjected to vibration, for example, marker and signal lights for trucks, trailers and the like.

A particular field of usefulness for the lamp assembly is in the vehicle field, particularly heavy duty equipment such as trucks and the like, where shocks and vibrations incident to travel over uneven road surfaces and contacts with other equipment result in damage and failure to the lights and bulbs thereof. Also, vehicles provided with electrical systems adapted for operation with an electrical power source of substantially higher voltage than the 6-volt systems formerly commonly employed on vehicles require lamp filament wires of smaller cross-section and, therefore, more fragile and likely to fracture and fail due to shock impact and vibration which results in necessity of frequent replacement and also danger or hazards in operation of the vehicle between bulb failure and replacement because of insufficient or improper marking.

The principal objects of the present invention are to provide a lamp assembly and mounting so constructed and arranged as to insulate vehicle lamps employing such filaments from road shock; to provide a lamp assembly with a resilient base in combination with rigid members to prevent excessive movement and reversals thereof and yet dampen vibrations and shocks imparted thereto; to provide such a structure wherein the resilient base has portions for receiving and supporting a lens and provide a dust and moisture seal for the interior of the lamp assembly; to provide such a structure with a positive enclosed ground connection that is protected from atmospheric elements; to provide a lamp assembly for surface mounting with a minimum of outward projection but with a large angle of emission of light therefrom; to provide a light assembly that is economical to manufacture, easily assembled and serviced and efficient in operation to reduce failure of bulbs resulting from shock, impact and vibration.

Other objects and advantages of this invention will become apparent from the following description taken in connection with the accompanying drawings wherein are set forth by way of illustration and example certain embodiments of this invention.

Figure 1:
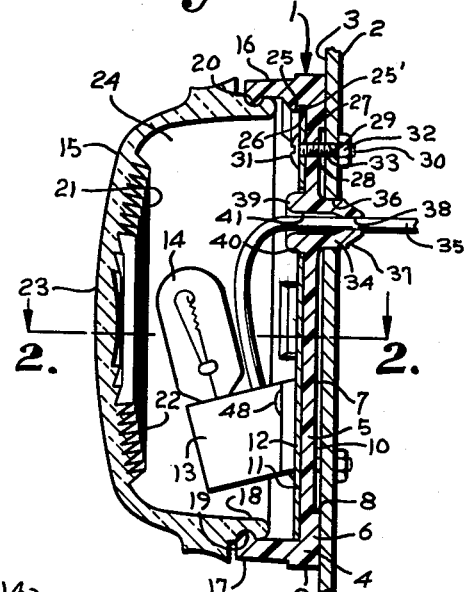
FIG. 1 is a sectional view through the lamp assembly and mounting.
Figure 2:
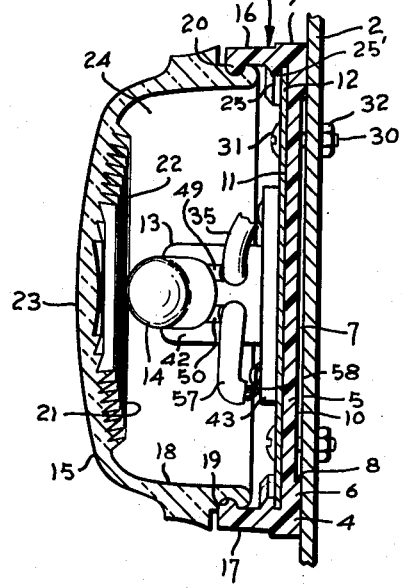
FIG. 2 is a sectional view through the lamp assembly and mounting taken on the line 2—2, FIG. 1.
Figure 3:
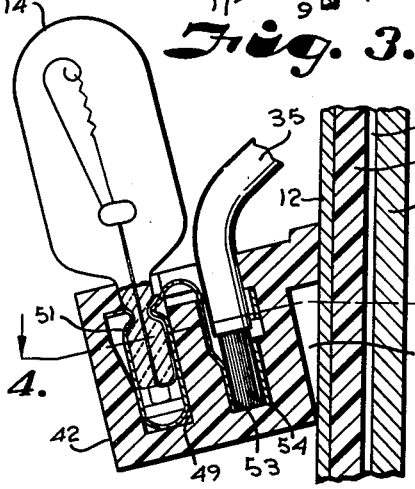
FIG. 3 is an enlarged fragmentary section through the assembly taken on the line 3—3, FIG. 4, and particularly illustrating the lamp socket.
Figure 4:
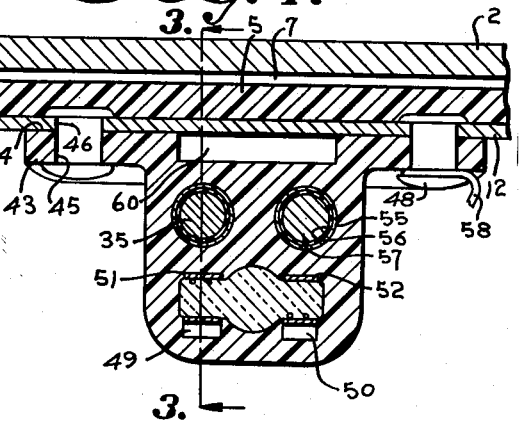
FIG. 4 is a fragmentary sectional view through the lamp assembly taken on the line 4—4, FIG. 3.
Figure 5:
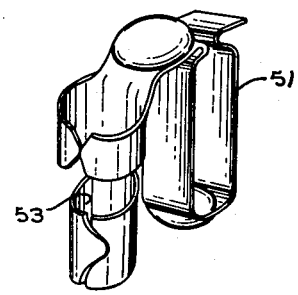
FIG. 5 is an enlarged perspective view of an electrical contact in the socket.

Referring more in detail to the drawings:

The reference numeral 1 generally designates a lamp assembly embodying the features of the present invention that is particularly adapted for surface mounting, as for example on a wall 2 of a vehicle such as a truck, trailer or the like, whereby the lamp assembly extends outwardly from the outer surface 3 of said wall. The lamp assembly 1 includes a base 4 of resilient material such as rubber or suitable yieldable synthetic resin, such as polyethylene, polyvinylchloride or other known yieldable plastics capable of deforming under stress and capable of automatic restoration to original form. In the illustrated structure, the base 4 is preferably molded as a single piece of material and includes a substantially flat rear wall 5 having a rear surface portion 6 adapted to engage the surface 3 of a wall 2 on which the lamp assembly is to be mounted. The wall 5 preferably has a central recess 7 with the periphery 8 thereof spaced inwardly from the periphery 9 of the base whereby the central portion of the wall 5 is spaced from the surface 3 of the mounting member and provides a rearward marginal portion presenting the surface 6. It is preferable that the surface 10 formed by the bottom of the recess be substantially parallel with the surface 6 and with the outer surface 11 of said wall 5.

The lamp assembly also includes a rigid plate 12, a bulb socket 13, a bulb 14, and a lens 15, all cooperating whereby the base member 4 and lens 15 form a housing for the bulb 14. The base member has a forwardly extending peripheral rim or flange 16 having an outer portion 17 surrounding a rearward peripheral wall portion 18 of the lens 15 and, in the structure illustrated, the wall portion 18 of the lens has a groove 19 extending around the periphery, said groove receiving an inwardly extending flange 20 or ridge on the rim 16. The material of the rim closely grips the portion 18 of the lens and thereby forms a liquid-tight, dustproof seal whereby it is substantially impossible for the inner surface 21 of the lens 15 to become dirty.

The lens 15 may be of any suitable transparent material such as an optical acrylic being non-yielding in characteristic and may be ribbed or otherwise internally configured as at 22 for desired distribution of light. The lens is preferably dome-like whereby the wall portion 18 extends rearwardly from the forward portion 23 of said lens and cooperates with the base to define a chamber 24 of suitable size to contain the socket member 13 and bulb 14.

The rigid plate 12 is preferably of metal and is of suitable size to cover substantially the entire forward face 11 of the base wall 5. It is preferred that a portion of the forwardly extending rim 16 have a plurality of circumferentially spaced inwardly extending protrusions or ears 25 having faces 25' parallel to and spaced from the walls 5 to form a groove 26 for receiving an edge of the rigid plate 12, said protrusions being arranged around the interior of the rim and cooperating with the wall 5 in an engagement with the plate 12 to retain same in position during shipping or handling. The plate 12 has a plurality of apertures 27 extending therethrough and in alignment with apertures 28 in the base wall 5 that are adapted to align with apertures 29 in the wall 2 on which the lamp is to be mounted for receiving suitable fastening devices 30 such as mounting bolts which, in the illustrated structure, have heads 31 engaging the plate 12 and nuts 32 screwed on the threaded shanks 33 and engaging the interior of the wall 2 to hold the base thereon with a compression of the resilient material of the base in that portion exteriorly of the recess 7 and interiorly of the rim 16. The base member also has at least one rearwardly extending conductor sleeve or appendage 34, the number of the sleeves 34 corresponding to the number of conductors 35 necessary for connecting a circuit to the bulb socket 13 for energizing the bulb 14. The sleeve 34 has sufficient length to extend clearly through aligned apertures 36 in the wall 2 or metal skin of a vehicle and terminates beyond said wall in a conical end portion 37 which has a bore 38 slightly smaller in diameter than the conductor 35 to be inserted therethrough for resilient engagement of said conductor. There is also an upstanding boss 39 that extends through an aperture 40 in the plate 12 to provide reinforcement and to protect the conductor from said plate. The boss 39 and sleeve have a counterbore 41 larger than the conductor 35 and terminating adjacent the base of the conical end portion 37 whereby said conductor is free in said counterbore and the sleeve at the conical end due to the bore 38 has a tight resilient grip on an insulated conductor to thoroughly seal same against atmospheric dust and moisture. The sleeve also provides an engagement tending to prevent the conductor from being pulled therefrom.

The socket member 13 may be of any suitable type to receive a conventional bulb 14, it being preferred that the socket member have a body 42 formed of non-conducting resilient material that is elastic throughout such as the material used for the resilient base.

In the structure illustrated, the bulb 14 is of the type known as "wedge-base bulbs" and the socket member is substantially of the type disclosed in our co-pending application, Serial No. 143,111, filed October 5, 1961. The body of the socket member has laterally extending flanges 43 with rear surfaces 44 adapted to engage the plate 12 and aligned apertures 45 and 46 in the flanges and plate 12 respectively to receive suitable fastening devices 48 for securing the socket member to the reinforcing plate 12. The socket member has spaced cavities 49 and 50 to receive terminal members 51 and 52 respectively adapted to grip the base of the bulb and, in the structure illustrated, the terminal member 51 has an extension in a recess 53 that is adapted to have electrical contact with an end 54 of the wire in the conductor 35. The terminal member 52 also has an extension 55 in a socket 56 for facilitating anchorage thereof and that is adapted to have electrical contact with an end of the wire of a ground conductor 57 which has its other end 58 connected to a rivet or fastening device 48 to form a ground connection which is completed through the plate 12, the fastening devices 30 and the wall 2 where said wall 2 is of metal.

If the lamp assembly is mounted on a wall that is a non-conductor, it is to be understood that the terminal 52 would be the same as the terminal 51 for connection through a wire of a conductor leading to a suitable ground.

It is preferred that the socket member 13 be arranged whereby the bulb base-receiving portion is at an angle to the rear faces of the flanges 43 to incline the bulb forwardly, as illustrated in FIG. 1, whereby there is substantially no interference to the wide angle emission of the light from the lamp assembly. The socket member may have a base-receiving cavity for receiving any conventional bulbs, but preferably has a cavity 60 in the rear of the body for reduction in the walls or sections and increased resiliency between the flanges 43 and the body, and it is preferred that the body portions of the socket member engage the bulb to aid in holding the bulb in complete isolation from shock, impact or vibration.

In assembly of a lamp from parts constructed as here described, the ground conductor 57 with its terminal 52 securely fixed to same is inserted into the cavity 50 in the bulb socket body 42. The insulated lead-in terminal 35 likewise securely fixed to the terminal 51 is likewise entered into its cavity 49 in the bulb socket body. This assembly of the body 42, terminals and projecting conductors 35 and 57 is now riveted or otherwise suitably secured to the reinforcing plate 12 with the grounding conductor 57 being entered through the hole of the socket body so that when the fastening device, as for example a rivet, is injected and turned over, the ground-conductor forms a secure and irrevocable ground connection from plate 12 to the bulb 14. This entire assembly of reinforcing plate 12 and bulb socket with its respective conductors is now placed inside the housing. The apertures 27 and 28 being aligned, and the sleeve 34 being also in alignment with the aperture 40 in the plate 12, the peripheral edge of the plate is now brought into confinements of the protrusions 25. Finally, the lens 15 is pressed into the aperture of the housing in order to complete the assembly of the lamp.

In mounting the assembly on a wall 2, the lens is removed and the fastening devices 30 inserted through the apertures 27 and 28 and the aperture 29 in the wall 2, and the nuts 32 applied to secure the base member to the wall 2, with the sleeve 34 extending through an aperture 36. With this arrangement, the outer portion of the base having the surface 6 engaging the wall 2 is compressed between the plate 12 and the wall 2 to make a tight seal and the wall portion 5 engages the plate 12 to dampen vibrations that might be transmitted thereto. Also, this compression tends to exert some force on the rim 16 to resist outward expansion thereof. The conductor 35 is then connected to the electrical circuit to supply energy to the bulb 14, and then the lens is arranged with the wall portion 18 engaging the rim 16 and pressed inwardly toward the base whereby the rim 16 is expanded outwardly and then snaps inwardly to engage the ridge 20 in the groove 19 to form a tight gripping action positively holding the lens in place with a tight seal that prevents entry of dirt, moisture and the like into the interior of the lamp assembly.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. A lamp assembly comprising,
   (a) a resilient base member having a substantially flat back adapted to engage a mounting surface,
   (b) said base member having a forwardly extending rim portion adjacent the periphery thereof and integral therewith,
   (c) a lens having a rearwardly extending wall portion that is received within said rim in closely embracing gripping relation to form a seal fit therebetween,
   (d) a rigid metal plate member overlying said flat back and having peripheral edges adjacent said base rim portion,
   (e) spaced fastening means engaging said plate and extending through said flat back for securing said plate and base member to a mounting surface with the back of the base member engaging the mounting surface,
   (f) a bulb socket member between the lens and plate and having a body of resilient material with integral outwardly extending flanges, said body and flanges being spaced from said fastening means,
   (g) and means engaging said plate and said flanges in spaced relation to the socket member body for securing said flanges to said plate.

2. A lamp assembly of claim 1 wherein:
   (a) said body member has a bulb receiving socket with spaced contacts in the socket for engaging terminals of a lamp bulb base and portions of the body associated therewith for engaging portions of the bulb and resiliently supporting same.

3. A lamp assembly of claim 1 wherein:
   (a) said body member has a bulb receiving socket with spaced contacts in the socket for engaging terminals of a lamp bulb base and portions of the body associated therewith for engaging portions of the bulb and resiliently supporting same,
   (b) one of said contacts having a portion extending through said body in electrical contact with said metal plate,
   (c) and a rearwardly extending boss on said base member terminating in an inwardly tapered end and having a bore therethrough adapted to receive a conductor for connection with the other contact in said socket member.

4. A lamp assembly comprising,
(a) a resilient base member having a substantially flat back adapted to engage a mounting surface,
(b) said base member having a forwardly extending rim portion adjacent the periphery thereof and integral therewith,
(c) a lens having a rearwardly extending wall portion that is received within said rim in closely embracing gripping relation to form a seal fit therebetween,
(d) one of said rim and wall portion having a peripheral groove and the other a flange engaged in said groove to retain the lens in said base member rim,
(e) a rigid metal plate member overlying said flat back and having peripheral edges adjacent said base rim portion,
(f) spaced fastening means engaging said plate and extending through said flat back for securing said plate and base member to a mounting surface with the marginal portion of the base member engaging the mounting surface,
(g) a bulb socket member between the lens and plate and having a body of resilient material with integral outwardly extending flanges, said body and flanges being spaced from said fastening means,
(h) and means engaging said plate and said flanges in spaced relation to the socket member body for securing said flanges to said plate,
(i) said body member having a bulb receiving socket with spaced contacts in the socket for engaging terminals of a lamp bulb base and portions of the body associated therewith for engaging portions of the bulb and resiliently supporting same.

5. A lamp assembly comprising,
(a) a resilient base member having a substantially flat back with a central recess extending forwardly from the rear thereof to define a marginal portion adapted to engage a mounting surface,
(b) said base member having a forwardly extending rim portion adjacent the periphery thereof and integral therewith,
(c) a lens having a rearwardly extending wall portion that is received within said rim in closely embracing gripping relation to form a seal fit therebetween,
(d) one of said rim and wall portion having a peripheral groove and the other a flange engaged in said groove to retain the lens in said base member rim,
(e) a rigid metal plate member overlying said flat back and having peripheral edges engaging said base rim portion adjacent said flat back,
(f) spaced fastening means engaging said plate and extending through said flat back for securing said plate and base member to a mounting surface with the marginal portion of the base member engaging the mounting surface,
(g) a bulb socket member between the lens and plate and having a body of resilient material with integral outwardly extending flanges, said body and flanges being spaced from said fastening means,
(h) and means engaging said plate and said flanges in spaced relation to the socket member body for securing said flanges to said plate.

6. A lamp assembly comprising,
(a) a resilient base member having a substantially flat back with a central recess extending forwardly from the rear thereof to define a marginal portion adapted to engage a mounting surface,
(b) said base member having a forwardly extending rim portion adjacent the periphery thereof and integral therewith,
(c) a lens having a rearwardly extending wall portion that is received within said rim in closely embracing gripping relation to form a seal fit therebetween,
(d) one of said rim and wall portion having a peripheral groove and the other a flange engaged in said groove to retain the lens in said base member rim,
(e) a rigid metal plate member overlying said flat back and having peripheral edges engaging said base rim portion adjacent said flat back,
(f) spaced fastening means engaging said plate and extending through said flat back for securing said plate and base member to a mounting surface with the marginal portion of the base member engaging the mounting surface,
(g) a bulb socket member between the lens and plate and having a body of resilient material with integral outwardly extending flanges, said body and flanges being spaced from said fastening means,
(h) means engaging said plate and said flanges in spaced relation to the socket member body for securing said flanges to said plate,
(i) said body member having a bulb receiving socket with spaced contacts in the socket for engaging terminals of a lamp bulb base and portions of the body associated therewith for engaging portions of the bulb and resiliently supporting same,
(j) one of said contacts having a portion extending through said body in electrical contact with said metal plate,
(k) and a rearwardly extending boss on said base member terminating in an inwardly tapered end and having a bore therethrough adapted to receive a conductor for connection with the other contact in said socket member.

References Cited in the file of this patent

UNITED STATES PATENTS

| | | |
|---|---|---|
| 2,099,444 | Langdon | Nov. 16, 1937 |
| 2,918,570 | Diedring | Dec. 22, 1959 |

FOREIGN PATENTS

| | | |
|---|---|---|
| 313,702 | Switzerland | Apr. 30, 1956 |
| 850,681 | Great Britain | Oct. 5, 1960 |